United States Patent
Bibr et al.

(10) Patent No.: US 8,433,822 B2
(45) Date of Patent: Apr. 30, 2013

(54) SYSTEM, METHOD AND APPARATUS FOR OPTIMIZED WIRELESS MESSAGING

(75) Inventors: Viera Bibr, Kilbride (CA); Vladimir Blagojevic, Toronto (CA); Laura Doktorova, Mississauga (CA); Brindusa L. Fritsch, Toronto (CA); Jeff C. Rogers, Scarborough (CA); Michael Shenfield, Richmond Hill (CA); Kamen Vitanov, Toronto (CA)

(73) Assignee: Research In Motion Limited, Waterloo (CA)

( * ) Notice: Subject to any disclaimer, the term of this patent is extended or adjusted under 35 U.S.C. 154(b) by 1910 days.

(21) Appl. No.: 11/074,660

(22) Filed: Mar. 9, 2005

(65) Prior Publication Data
US 2006/0205420 A1 Sep. 14, 2006

(51) Int. Cl.
 *G06F 15/16* (2006.01)
(52) U.S. Cl.
 USPC .......................................... 709/246; 709/218
(58) Field of Classification Search .................. 709/246, 709/218
 See application file for complete search history.

(56) References Cited

U.S. PATENT DOCUMENTS

| | | | |
|---|---|---|---|
| 6,345,307 B1 * | 2/2002 | Booth ............................. | 709/247 |
| 6,397,259 B1 * | 5/2002 | Lincke et al. ................. | 709/236 |
| 7,499,967 B2 * | 3/2009 | Hulse et al. ................... | 709/203 |
| 7,506,021 B2 * | 3/2009 | Polan et al. ................... | 709/201 |
| 7,549,153 B2 * | 6/2009 | Butterworth et al. ......... | 719/317 |
| 7,600,232 B2 * | 10/2009 | Hunt et al. .................... | 719/313 |
| 8,209,392 B2 * | 6/2012 | Brabec et al. ................. | 709/209 |
| 8,289,983 B2 * | 10/2012 | Wang ............................. | 370/401 |
| 2003/0013431 A1 * | 1/2003 | O'Hare et al. ................. | 455/412 |
| 2003/0061404 A1 * | 3/2003 | Atwal et al. .................... | 709/328 |
| 2005/0004972 A1 * | 1/2005 | Meskauskas ................... | 709/200 |
| 2006/0165105 A1 * | 7/2006 | Shenfield et al. ............. | 370/401 |
| 2006/0168355 A1 * | 7/2006 | Shenfield et al. ............. | 709/250 |

FOREIGN PATENT DOCUMENTS

| | | |
|---|---|---|
| GB | 2372180 A | 8/2002 |
| WO | WO 03/073719 | 9/2003 |
| WO | WO 03/073719 A1 * | 9/2003 |

OTHER PUBLICATIONS

Wu, et al. "Lightweight SIP/SDP Compression Scheme (LSSCS)", Wireless and Mobile Communications, 2001, pp. 67-76, vol. 4586, Beijing China.

Majumdar, et al., "Text-based Compression Using Cache and Blank Approach (TCCB)", Internet Draft, Jul. 2001, pp. 1-25.

Sundaresan, et al. "Algorithms and programming models for efficient representation of XML for Internet applications", Computer Networks, 2002, pp. 681-697, vol. 39, Elsevier Science B.V.

Ghayour, Mehdi. Canadian Intellectual Property Office Examiner's Report dated Apr. 2, 2012, in relation to Canadian Patent Application No. 2,539,094, 3 pages.

(Continued)

*Primary Examiner* — Douglas Blair (57) ABSTRACT

Wireless data message optimization for messages sent between a wireless device and a server that provides a service that the wireless device is authorized to access is provided using an application gateway that serves as a proxy between the wireless device and the server. The application gateway maps optimized service request messages generated by the wireless device to a service request message format expected by the server, and maps response messages generated by the server to an optimized response message format expected by the wireless device. The optimized message format is flattened by removing unnecessary message structure, eliminates unnecessary message fields, and uses default and enumeration encoding to reduce optimized message size.

18 Claims, 6 Drawing Sheets

OTHER PUBLICATIONS

Wu, Jian J. and Demetrescu, Cristian. "Lightweight SIP/SDP compression scheme (LSSCS)", Proc. SPIE 4586, Wireless and Mobile Communications, 67, Oct. 18, 2001. pp. 67-76.

Sundaresan, Neel and Moussa, Reshad. "Algorithms and programming models for efficient representation of XML for Internet applications". Computer Networks, vol. 39, Issue 5, Aug. 5, 2002, pp. 681-697.

Majumdar, Ishita et al. "Text-Based compression using cache and blank approach (TCCB)". IETF Internet Drafts, draft-ziyad-rohc-tccb-00, Jul. 27, 2001. pp. 1-25.

* cited by examiner

SYSTEM, METHOD AND APPARATUS FOR OPTIMIZED WIRELESS MESSAGING

CROSS-REFERENCE TO RELATED APPLICATIONS

This is the first application filed for the present invention.

MICROFICHE APPENDIX

Not Applicable.

TECHNICAL FIELD

This application relates generally to wireless communications and wireless communications devices and, in particular, to a method and apparatus for wireless message optimization.

BACKGROUND OF THE INVENTION

The acceptance of wireless devices as a preferred personal communications medium has created a growing demand for such devices. Users of such devices also increasingly expect more functionality and a broader range of services to be made available through such devices. Not only is there a demand for more functionality, there is also a demand for faster response times and more efficient access to remote services.

Data message optimization is not new and a compact messaging system and method is taught in the Assignee's published U.S. patent application No. US 2004/0194105 A1 published Sep. 30, 2004, the specification of which is incorporated herein by reference.

Nonetheless, there remains a need for a system and method that provides an even higher level of optimization in order to ensure that wireless messaging can keep up with demand and that wireless device users remain satisfied with the performance of their mobile devices.

SUMMARY OF THE INVENTION

It is therefore an object of the invention to provide a system and method for optimized wireless messaging that permits transparent, efficient wireless messaging between mobile devices and device services.

In accordance with the first aspect of the invention, there is provided a method of wireless message optimization, comprising: generating service request messages in an optimized service request message format at a wireless device and forwarding the optimized service request messages to an application gateway; and receiving the optimized service request messages at the application gateway and mapping the optimized service request messages to a service request message format expected by the service before forwarding the service request messages to the server that provides the service, and receiving service response messages from the server and mapping the service response messages to the optimized response message format before forwarding the service response messages to the wireless device.

In accordance with another aspect of the invention, there is provided a system for optimized wireless messaging, comprising: a wireless device that generates service request messages in an optimized service request message format and processes response messages received in the optimized service response message format; and an application gateway that serves as a proxy between the wireless device and a server that provides a service requested by the optimized service request messages generated by the wireless device, the application gateway mapping the optimized service request messages to service request messages in a format expected by the service and mapping service response messages received from the server to an optimized service response message format expected by the wireless device.

In accordance with yet a further aspect of the invention, there is provided an apparatus for compact wireless messaging, comprising: an application gateway that serves as a proxy between a wireless device and a server that provides a service requested by optimized service request messages generated by the wireless device, the application gateway receiving the optimized service request messages and mapping the optimized service request messages to a service request message format expected by the service; and the application gateway receiving response messages from the server and mapping the response messages to an optimized service response message format expected by the wireless device and sending the optimized service response messages to the wireless device.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The invention provides a system, method and apparatus for optimized wireless messaging. In accordance with the invention, wireless devices generate service request messages in an optimized service request message format. The optimized service request messages are sent over a wireless link to an application gateway. The application gateway maps the optimized service request messages to a service request message format expected by the web service from which the service is. requested. The application gateway then forwards the web service request message. to an appropriate server. The server processes the message and provides a response. The application gateway maps the service response message to an optimized service response message format that is returned to the wireless device through the wireless network. The wireless device processes the optimized service response message and presents the service response message to the wireless device user. Several optimization methods are used to reduce wireless message size. For example, messages are flattened to remove any message structure not required by the wireless device. In addition, 1-bit default indicators are used to minimize the transfer of default information, and null fields are encoded. Enumeration indexes are also used to transfer information that can be retrieved from an enumeration list, and unnecessary fields are discarded. These techniques provide an optimized wireless message format that significantly reduces wireless bandwidth usage and improves wireless service performance.

Figure 1:
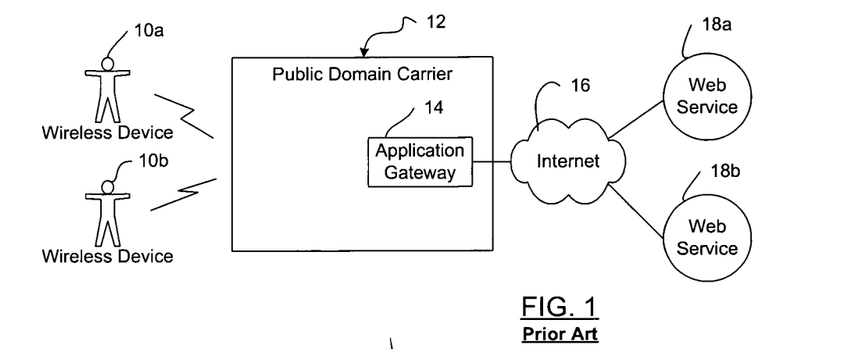
FIG. 1 is a block diagram of a prior art wireless network system.

FIG. 1 is a block diagram of a prior art network in which wireless device users 10a, 10b send web service request messages via a public domain carrier 12 to an application gateway 14. The application gateway 14 forwards the web service request messages through the internet 16 to an appropriate web service 18a, 18b. The messages are processed by the appropriate web service 18a, 18b and returned through the internet 16 to the application gateway 14. The public domain carrier 12 forwards the response messages to the wireless device 10a, 10b which processes the response and displays response content to the wireless device user.

System Overview

Figure 2:
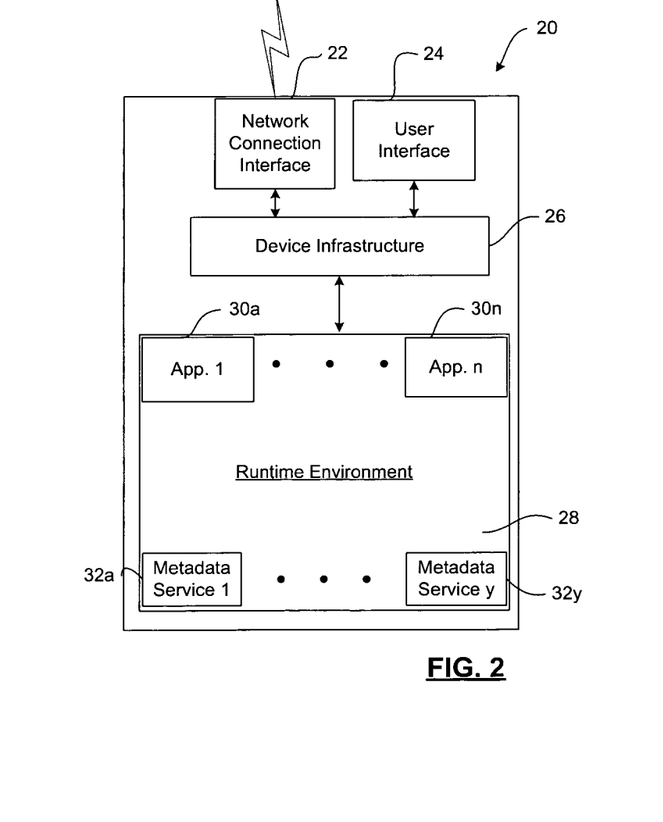
FIG. 2 is a block diagram of a wireless device in accordance with the invention.

FIG. 2 is a block diagram of a wireless device 20 in accordance with the invention. The wireless device 20 includes a network connection interface 22 that is well known in the art and used to communicate wirelessly with the public domain carrier 12. The wireless device further includes a user interface 24, which may be a keypad, a touch sensitive screen, voice recognition software, or any other user interface for wireless devices. A device infrastructure 26 includes memory, processor(s), peripheral ports, keypad, display and other hardware components required to support the functionality of the wireless device 20. A run time environment 28 supports a plurality of user applications 30a, 30n that provide user services available through the wireless device 20. In accordance with the invention, the run time environment 28 is further provided with one or more metadata services 32a, 32y used for optimized wireless messaging in accordance with the invention, as will be explained below in detail.

Figure 3:
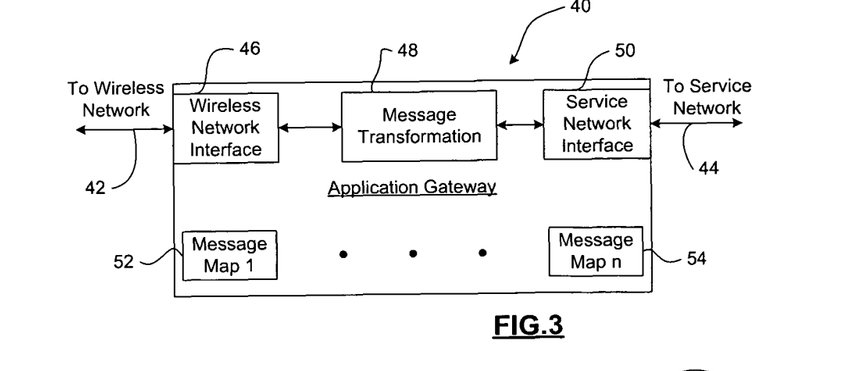
FIG. 3 is a block diagram of an application gateway in accordance with the invention.

FIG. 3 is a block diagram of an application gateway 40 in accordance with the invention. The application gateway supports a wireless network interface 46 having a link 42 to the wireless network. A message transformation function 48 receives messages from the wireless network interface 46 and processes the messages before forwarding the messages to a service network interface 50. The service network interface 50 has a link to a service network 44 (the Internet, for example) over which it forwards the messages to an appropriate web service(s). In accordance with the invention, the application gateway 40 is provisioned with a plurality of message maps 52, 54. The message maps 52, 54 are used by the message transformation function 48 to process service request and service response messages, as will be explained below in detail with reference to FIGS. 4-7.

Operation Overview

Figure 4:
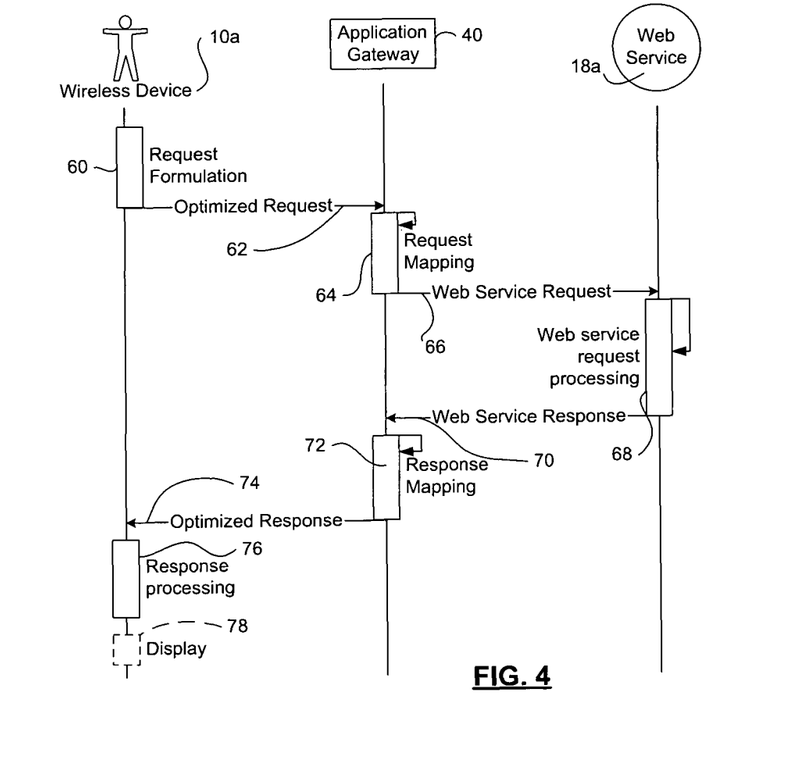
FIG. 4 is a high level overview of messaging between a wireless device in a system in accordance with the invention.

FIG. 4 is a high level overview of optimized wireless messaging in accordance with the invention. In step 60 a wireless device 10a formulates an optimized service request message when a user requests a service from web service 18a. The optimized service request message is forwarded to the application gateway (step 62) which performs service request message mapping in step 64 to transform the service request message into a web service request message format expected by the web service 18a. The application gateway forwards the web service request message to the web service 18a (step 66), which receives the web service request message and processes the message in a manner well known in the art (step 68). The web service 18a then formulates and returns a web service response message (step 70). The application gateway 40 receives the web service response message, correlates the web service response message with the web service request message sent earlier, and performs web service response message mapping in step 72 to transform the web service response message to an optimized response message format. The application gateway 40 forwards the optimized response message to the wireless device 10a in step 74. The wireless device 10a receives the optimized service response message and performs a service response message processing function in step 76. As required, the service response message generates a display of information to the user in step 78.

Figure 5:
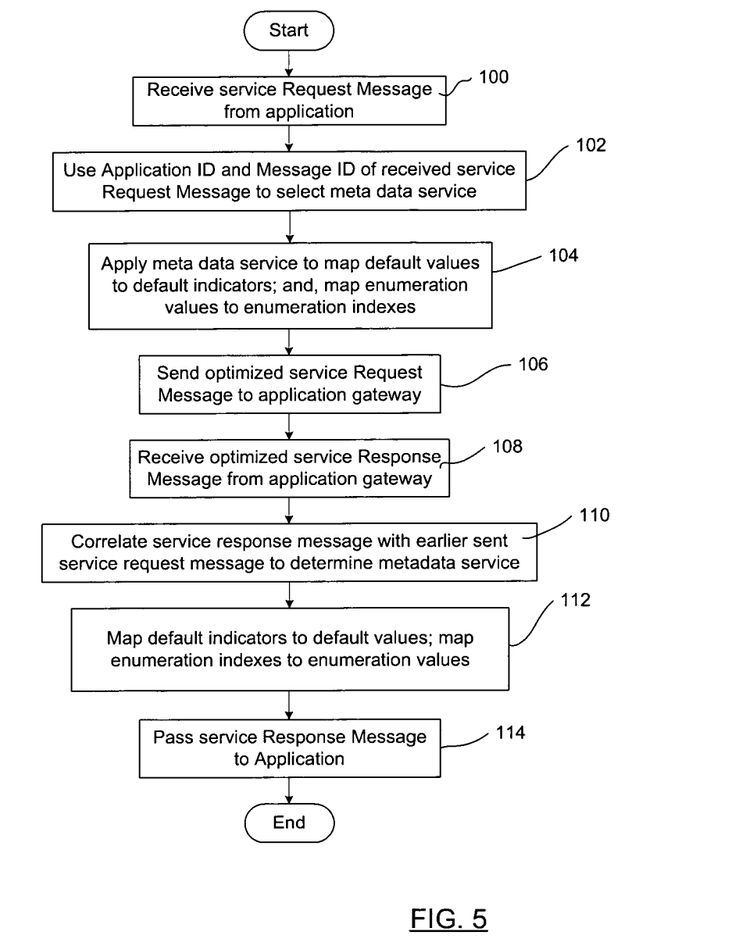
FIG. 5 is a flowchart of steps performed by a wireless device run time environment each time a service request message is received from an application supported by the run time environment or a response directed to the application is received from the application gateway.

FIG. 5 is flowchart of actions performed by the run time environment 28 of the wireless device 10a when the application 30a generates a service request message for the web service 18a, or the network connection interface 22 receives a service response message from the application gateway 40. In accordance with the invention, the applications 30a, 30n supported by the wireless device 20 are programmed to operate in a partially optimized mode and generate service request messages that are partially optimized. The applications 30a, 30n also process service response messages that are partially optimized. However, further optimization is provided by the metadata services 32a, 32y as illustrated in the flowchart shown in FIG. 5.

In step 100 the runtime environment 28 receives the service request message from the application 30a. The runtime environment extracts an application ID and a message ID from the received service request message and uses them to select the metadata service 32a to be used to process the service request/response messages (step 102). The runtime environment 28 applies the metadata service 32a to map default values in the receive message to default indicators in the optimized message; to map enumeration values in the received message to enumeration indexes in the optimized message (step 104); and, to perform null field encoding. Each of these operations will be described below in more detail.

The runtime environment then forwards the optimized service request message to the application gateway (step 106). The application gateway maps the optimized service request message to a web service request message, as will be explained below with reference to FIG. 5. In due course, the application gateway 40 returns an optimized service response message that is received by the runtime environment 28 in step 108. The runtime environment 28 correlates the service response message with the earlier sent service request message to determine the metadata service 32a used to process the optimized service response message (step 110). The metadata service maps default indicators in the optimized service response message to default values in the partially optimized message that is passed to the application 30a, and encode null fields. The metadata service 32a likewise maps enumeration indexes in the optimized service response message to enumeration values in the partially optimized service response message (step 112). The run time environment then passes the partially optimized service response message to the application 30a in step 114 and the process ends.

Figure 6:
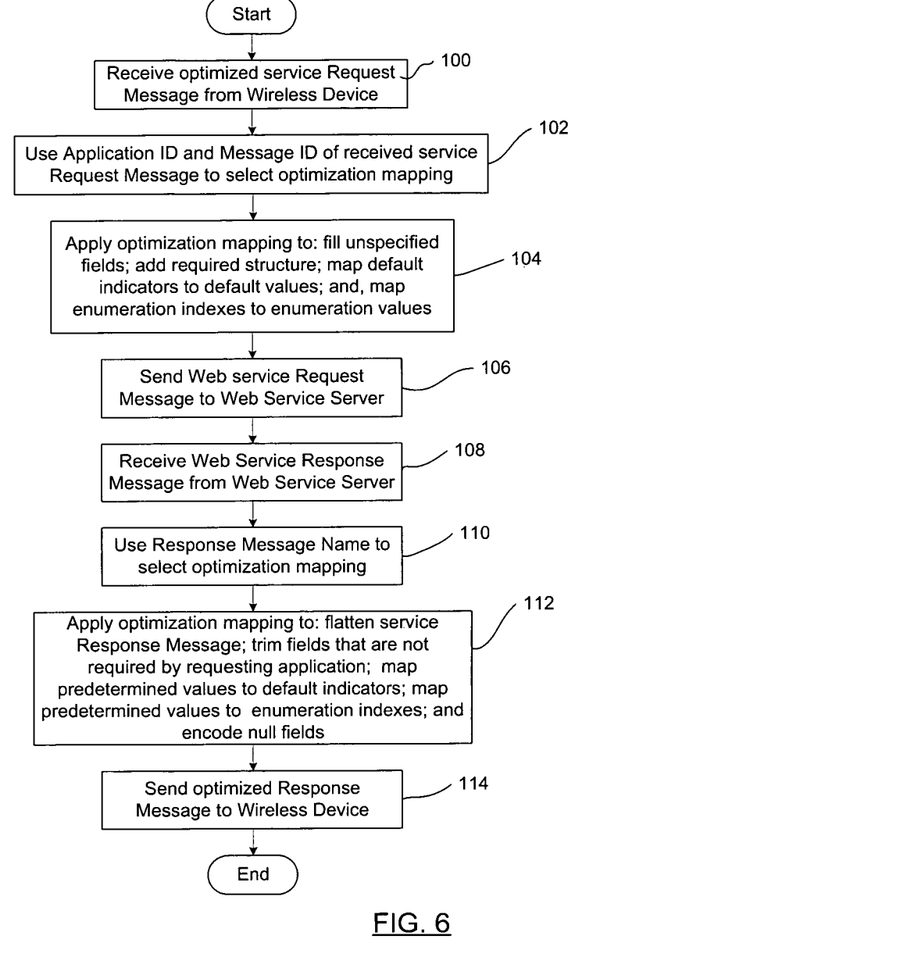
FIG. 6 is a flowchart of steps performed by the application gateway each time an optimized service request message is received from a wireless device or a web service response message is returned from a web service in response to a service request message.

FIG. 6 is flow diagram detailing functions performed by the application gateway 40 in steps 64 and 72 of FIG. 3. In step 150, the application gateway 40 receives the optimized service request message from the wireless device. The application gateway 40 uses the application ID and the message ID of the received service request message to select the optimization mapping 52 (FIG. 3) required by the message transformation function 48 to transform the optimized service request message to a format expected by the web service 18a (step 152). As will be explained below with reference to FIGS. 6 and 7, the optimization mapping is applied (step 154) to fill fields in the web service request message that are not included in the optimized service request message; add structure to the web service request message expected by the web service 18a; map default indicators in the optimized service request message to default values in the web service request message; insert null fields and expand encoded strings and arrays; and map enumeration indexes in the optimized service request message to enumeration values in the web service request message.

The default indicators are preferably single bit values used to indicate default values to be inserted in selected fields, as will be explained below in more detail. The enumeration indexes are numeric indexes used to select values from enumeration lists maintained by both the wireless device 20 run time environment 28 and the application gateway 40 transformation function 48. The null fields are encoded and strings and arrays are compressed to their actual length.

After the message transformation function has finished constructing the message in the format expected by the web service 18a, the web service request message is forwarded to the web service server (step 156). The web service server processes the web service request message as described above with reference to FIG. 5 and returns a web service response message. The application gateway application gateway 40 receives the web service response message from the web service server 18a (step 158). The web service response message Name is used to select the optimization mapping for the service response message (step 160). The application gateway then applies the optimization mapping to: flatten the web service response message by removing any unnecessary data structure from the message (XML tree structures, for example) ; trim fields that are not required by the requesting application; map predetermined values to default indicators; apply null field encoding; and map predetermined values to enumeration indexes (step 162). The application gateway then returns the optimized service response message to the wireless device (step 164) and the process ends. The wireless device 20 run time environment 28 processes the optimized service response message as described above with reference to FIG. 5.

Message Transformation

Figure 7:
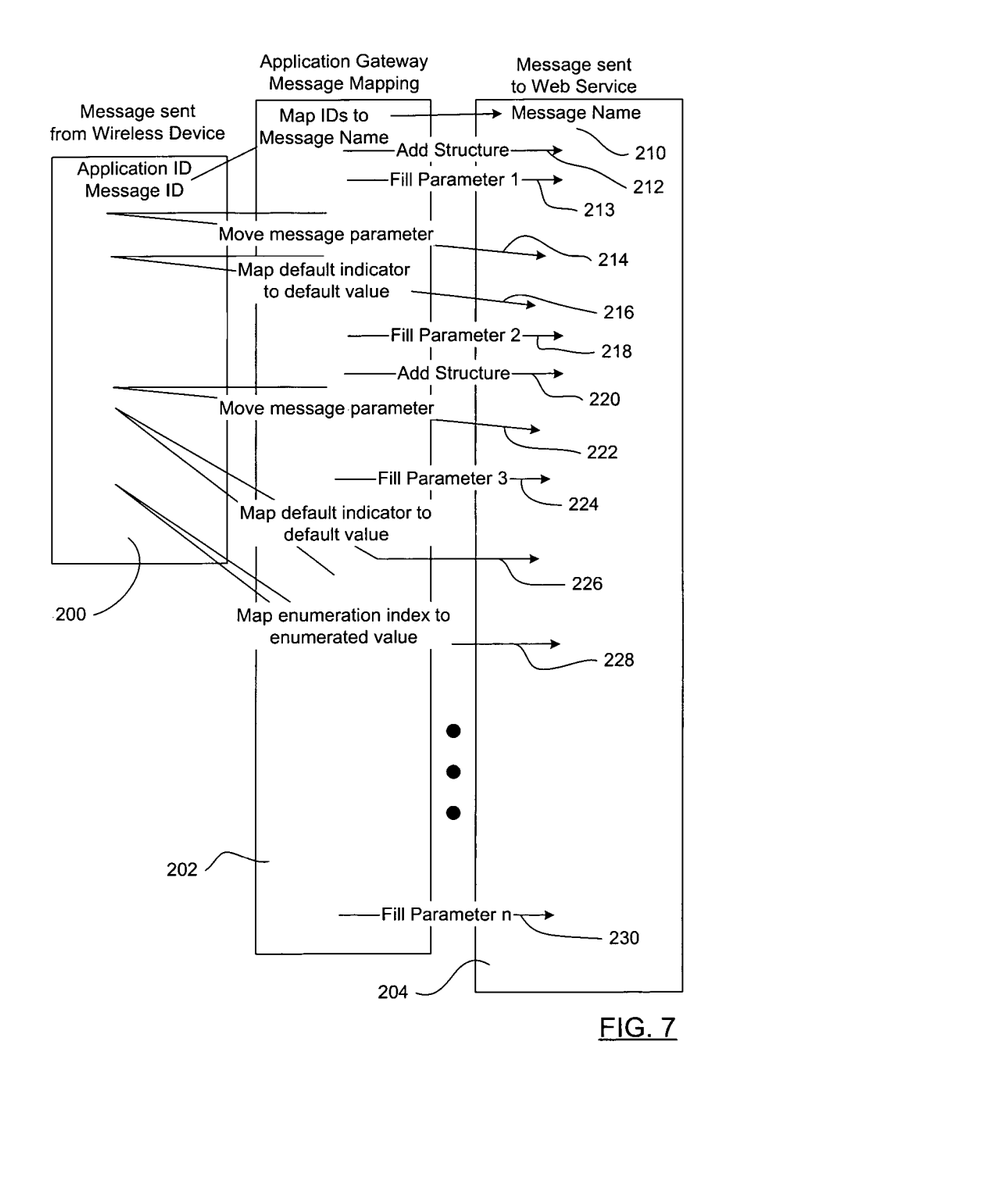
FIG. 7 is a schematic diagram of the mapping of a wireless message to a web service request message.

FIG. 7 is a schematic diagram of message transformation performed by the message transformation function 48 when the application gateway 40 receives an optimized service request message 200 from a wireless device 10a. The sequence of events described below with reference to steps 210-228 is exemplary only. As will be understood by persons skilled in the art, the message map 52, 54 (FIG. 3) selected as described above will dictate the actual sequence in which a service request message 200 is transformed. That sequence is a matter of design choice.

In this example, the message transformation function 48 extracts an Application ID and a Message ID from the optimized service request message 200 and maps the application ID and message ID to a web service request Message Name required by the web service 18a. The web service request Message Name is inserted into the web service request message 204. In step 212, the message map 204 directs the message transformation function 48 to add message structure required in the web service request message 204 by the web service 18a. In step 213, the message map 204 directs the message transformation function 48 to insert a fill parameter in the web service request message. The fill parameter is a parameter expected by the web service 18a, but not supplied in the optimized request message 200. At 214, the message map 204 directs the message transformation function 48 to move a message parameter from the optimized service request message 200 to the web service request message 204. At 216, a default indicator is mapped to a default value that is inserted in the web service request message 204.

Default indicators may be coded in many ways. In one embodiment of the invention, one or more bytes of the optimized service request message 200 are reserved as default indicators. Each byte provides a default indicator for up to 8 fields in the web service request message 204. Each bit in each byte provides one default indicator. If, for example, "one" is used as a default indication value, each bit set to "one" directs the message transformation function 48 to map a default value into a predetermined field in the web service request message 204. If a bit is set to "zero" the default is not-used and an actual field value is retrieved from the optimized service request message 200 and inserted into the web service request message 204.

At 218, a second fill parameter is mapped to the web service request message 204. The fill parameter may be a required field in the web service request message 204 that is not provided in the optimized service request massage 200, or an encoded string, array or component in the optimized service request message 200. For components, the method described above for default value encoding can be used for null field indication. Consequently each component in a message has an associated indicator bit in the optimized service request message 200 that indicates whether the component is null.

In the case of strings and arrays, a length byte associated with each string and each array indicates a length of the data in the optimized service request message 200. If a value of the length byte is "zero", the string or array is null and is absent from the optimized service request message 200. If the length byte is not "zero" the actual length of the field value is indicated.

At 220, more message structure not supplied by the optimized service request message 200 is added to the web service request message 204. At 222, another message parameter is moved from the optimized service request message 200 to the web service request message 204, and at 224 a third fill parameter is inserted into the web service request message 204. At 226, another default indicator is mapped to a default value that is inserted into the web service request message 204. At 228 an enumeration index is mapped to an enumerated value that is inserted into the web service request message 204.

In accordance with the invention, message optimization is further enhanced by the use of enumeration indexes. Enumeration indexes permit a numeric index to be passed in optimized service request messages 200 in lieu of a value selected from an enumeration list. Both the message transformation function 48 of the application gateway 40 and the metadata services 32a, 32y of the wireless device 20 have knowledge of enumeration lists used in web service request/response messages. Consequently, the optimized request message 200 carries an enumeration index in lieu of an enumeration value for each field associated with an enumeration list. The message map 202 maps the enumeration index to an enumeration value selected from an enumeration list and inserts the enumeration value into the web service request message 204 because the web service 18a expects the enumeration value.

These message transformation and mapping functions continue until an end of the message map 202 is reached, in this example by inserting a fill parameter n at 230. After message transformation is complete, the application gateway 40 forwards the web service request message 204 to the web service 18a, as explained above with reference to FIG. 5.

Figure 8:
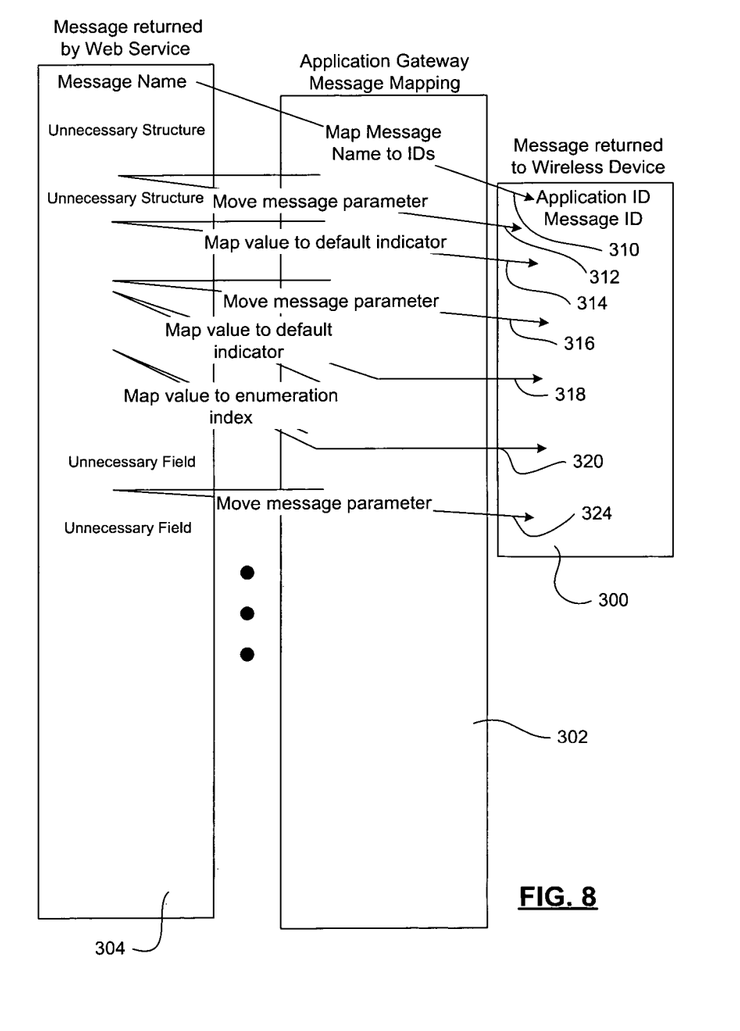
FIG. 8 is a schematic diagram of the mapping of a web service response message to a wireless device message.

FIG. 8 is a schematic diagram of the reverse process in which the message transformation function 48 of the application gateway 40 optimizes a service response message 304 returned by the web service 18a to the application gateway 40. The application gateway 40 uses a message map 302 to transform the web service response message to an optimized response message 300 returned to the wireless device. This process is a reverse of the process described above with reference to FIG. 7. As explained above, the sequence of events described below is exemplary only and the sequence of map functions is a matter of design choice.

At 310 a message name carried in the web service response message 304 is mapped to an application ID and message ID as a first step in service response message optimization. As explained above with reference to FIG. 5, the optimized response message is flattened by eliminating unnecessary structure in the web service response message 304. Consequently, unnecessary structure is not mapped from the web service response message 304 to the optimized response message 300. A required message parameter is mapped from the web service response message 304 to the optimized response message 300 at 312. At 314, a value in the web service response message is mapped to a default indicator in the optimized service response message 300. Another message parameter is mapped from the web service response message 304 to the optimized service response message 300 at 316. At 318, another value in the web service response message is mapped to a default indicator in the optimized service response message 300. Unnecessary fields are not mapped to the optimized response message 300 as schematically illustrated by the labels "unnecessary field" in the web service response message 304. At 324, another message parameter is mapped from the web service response message to the optimized response message 300. Null components are also encoded using a bit indicator as described above with reference to FIG. 7, and field length indicators are created for all strings and arrays as also described above. This process iterates until an end of the message transformation map 302 is reached. Thereafter the optimized service response message is sent to the wireless device 20.

Although the message optimization in accordance with the invention has been described with explicit reference to worldwide web services, it should be understood that the message can be, and is, used to optimize wireless messaging used for any purpose. The system, method and apparatus in accordance with the application therefore has broad utility and is not limited to web services described above by way example.

The embodiments of the invention described above are intended to be exemplary only. The scope of the invention is therefore intended to be limited solely by the scope of the appended claims.

We claim:

1. A method of wireless message optimization, comprising:

at a wireless device, generating a service request message in an optimized service request message format by mapping default values in a plurality of components of the message to default indicators, mapping enumeration values in said plurality of components of the message to enumeration indexes, performing null field encoding on null fields in said plurality of components of the message, and forwarding the optimized service request message to an application gateway;

receiving the optimized service request message at the application gateway;

using a mapping selected based on an application identification code (application ID) and a message identification code (message ID), transforming the optimized service request message to a web service request message having a format expected by a web service, before forwarding the web service request message to a server that provides the web service, by mapping default indicators in the optimized service request message to default values in the web service request message, inserting null fields by expanding encoded strings and arrays, and mapping enumeration indexes in the optimized service request message to enumeration values in the web service request message; and receiving a service response message from the web server and mapping the service response message to an optimized response message format before forwarding the service response message in the optimized response message format to the wireless device.

2. The method as claimed in claim 1 wherein said transforming the optimized service request message to the web service request message further comprises adding structure to the web service request message.

3. The method as claimed in claim 1 wherein said transforming the optimized service request message to the web service request message further comprises adding default values to the web service request message when the optimized service request message includes default indicators.

4. The method as claimed in claim 1 wherein said mapping said enumeration indexes in the optimized service request message comprises adding values to the web service request message selected from at least one enumeration list when the optimized service request message includes one or more enumeration indexes.

5. The method as claimed in claim 1 wherein said transforming the optimized service request message to the web service request message further comprises mapping predetermined values into each field of the web service request message for which the optimized service request message does not provide a value or a parameter that indicates a value to be mapped in any required field of the web service request message.

6. The method as claimed in claim 1 wherein mapping the service response message further comprises trimming any fields from the service response message that are not required by the application that sent the optimized service request message.

7. The method as claimed in claim 1 wherein mapping the service response message to an optimized response format comprises flattening the service response message by removing unnecessary data structure from the service response message.

8. The method as claimed in claim 1 wherein mapping the service response message to an optimized service response format comprises mapping predetermined values in the service response message to default indicators incorporated in the optimized service response message.

9. The method as claimed in claim 1 wherein the mapping the service response message to an optimized service response message format further comprises mapping predetermined values to enumeration indexes in the optimized service response message.

10. The method as claimed in claim 1 further comprising mapping a Message Name in the service response message received from the web server to the message ID and using the message ID in the optimized service response message.

11. The method of claim 1 wherein said performing null field encoding on null fields comprises providing indicator values in the device optimized web service request messages indicating whether said components of the messages are null.

12. A system for optimized wireless messaging, comprising:
a wireless device that generates a service request message in an optimized service request message format by mapping default values in a plurality of components of the message to default indicators, mapping enumeration values in said plurality of components of the message to enumeration indexes, and performing null field encoding on null fields in said plurality of components of the message, and processes a response message received in an optimized service response message format; and
an application gateway that serves as a proxy between the wireless device and a server that provides a web service requested by the optimized service request message generated by the wireless device, the application gateway selecting, from a plurality of mappings, based on an application identification code (application ID) and message identification code (message ID), a mapping for the optimized service request message, and using the selected mapping to transform the optimized service request message to a web service request message in a format expected by the web service by mapping default indicators in the optimized service request message to default values in the web service request message, inserting null fields by expanding encoded strings and arrays, and mapping enumeration indexes in the optimized service request message to enumeration values in the web service request message; and mapping a service response message received from the server to an optimized service response message having a format expected by the wireless device.

13. The system as claimed in claim 12 wherein the wireless device incorporates default value indicators in the optimized service request message, the default value indicators indicating default values to be mapped into the web service request message by the application gateway.

14. The system as claimed in claim 12 wherein the wireless device further incorporates enumeration indexes in the optimized service request message, the enumeration indexes indicating values to be mapped from at least one enumeration list into the web service request message by the application gateway.

15. Apparatus for compact wireless messaging, comprising:
an application gateway that serves as a proxy between a wireless device and a server that provides a web service requested by an optimized service request message generated by the wireless device, said optimized service request message containing an application identification code (application ID) and a message identification code (message ID), the application gateway receiving the optimized service request message and selecting, based on both said application ID and said message ID of the optimized service request message, a mapping for that optimized service request message from a plurality of mapping, said application gateway further using the selected mapping to transform the optimized service request message to a web service request message in a format expected by the web service by mapping default indicators in an optimized service request message to default values in the web service request message, inserting null fields by expanding encoded strings and arrays, and mapping enumeration indexes in the optimized service request message to enumeration values in the web service request message; and
the application gateway receiving a response message from the server and mapping the response message to an optimized service response message having a format expected by the wireless device and sending the optimized service response message to the wireless device.

16. The apparatus as claimed in claim 15 wherein said transforming comprises at least one of:
mapping predetermined default values into web service request message fields not included in the optimized service request message;
mapping predetermined default values into selected fields in the web service request message, the default values being indicated by default indicators incorporated in the optimized service request message;
mapping null components, strings and arrays into the web service request message using null field encoding embedded in the optimized service request message;
mapping values from at least one enumeration list into the web service request message using enumeration index codes incorporated in the optimized service request message;
mapping expected message structure into the web service request message; and
mapping a content of selected fields from the optimized service request message to the web service request message.

17. The apparatus as claimed in claim 15 wherein the application gateway maps the service response message to the optimized service response message by performing at least one of:
ignoring fields in the service response message that are not used by the application;
mapping selected field values in the service response message to default indicators incorporated in the optimized service response message;
mapping null components in the service response message to null component indicators in the optimized service response message;
mapping selected field values to enumeration indexes incorporated in the optimized service response message;
ignoring complex data structure in the service response message when the complex data structure is not required by the application; and
mapping a content of selected fields from the response message to the optimized service response message.

18. The apparatus as claimed in claim 17 wherein the application gateway is further programmed to map default values into at least one selected field of the optimized service response message if the service response message does not contain a value for the at least one selected field.

* * * * *